US012743843B2

(12) United States Patent
Ricard et al.

(10) Patent No.: US 12,743,843 B2
(45) Date of Patent: Sep. 22, 2026

(54) DYNAMIC BLOCK DECIMATION IN V-PCC DECODER

(71) Applicant: InterDigital CE Patent Holdings, SAS, Paris (FR)

(72) Inventors: Julien Ricard, Plouër-sur-Rance (FR); Julien Mulard, Cesson-Sevigne (FR); Celine Guede, Cesson Sevigne (FR); Olivier Mocquard, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 112 days.

(21) Appl. No.: 18/853,906

(22) PCT Filed: Mar. 23, 2023

(86) PCT No.: PCT/EP2023/057567

§ 371 (c)(1), (2) Date: Oct. 3, 2024

(87) PCT Pub. No.: WO2023/198426

PCT Pub. Date: Oct. 19, 2023

(65) Prior Publication Data

US 2025/0225714 A1 Jul. 10, 2025

(30) Foreign Application Priority Data

Apr. 13, 2022 (EP) .................................... 22305539

(51) Int. Cl.

| | |
|---|---|
| ***G06T 15/20*** | (2011.01) |
| ***G06T 9/00*** | (2006.01) |
| ***G06T 17/00*** | (2006.01) |

(52) U.S. Cl.

CPC ................ *G06T 15/20* (2013.01); *G06T 9/00* (2013.01); *G06T 17/00* (2013.01); *G06T 2210/12* (2013.01); *G06T 2210/56* (2013.01)

(58) Field of Classification Search

CPC ...................................................... G06T 17/00

See application file for complete search history.

(56) References Cited

U.S. PATENT DOCUMENTS

| | | | | |
|---|---|---|---|---|
| 2009/0238492 | A1* | 9/2009 | Lenke ................... | G06T 3/4007 382/300 |
| 2019/0311500 | A1* | 10/2019 | Mammou ............... | G06T 9/001 |
| 2022/0060529 | A1* | 2/2022 | Oh ....................... | H04N 13/194 |

OTHER PUBLICATIONS

Hosseini et al., "Dynamic Adaptive Point Cloud Streaming," arXiv:1804.10878v2 [cs.MM] Apr. 29, 2018, 7 pages.

(Continued)

*Primary Examiner* — Nan-Ying Yang

(74) *Attorney, Agent, or Firm* — Xiaoan Lu

(57) ABSTRACT

In one implementation, we propose to change the decoding process of blocks within V-PCC patches by directly decoding blocks at reduced resolutions, allowing a less computationally intensive rendering of the point cloud. In one example, based on the rendering information from the renderer, we evaluate for each patch, for each block component of the patches, or for each pixel of the patches, if the corresponding reconstructed point will be viewed by the user after the rendering process and which decimation level could be selected without impairing significantly the rendering quality. Based on the evaluation results, we decide whether to render or not the current area and at which resolution. In one approach, we compare the distance to the screen to a ranges of distance thresholds. In another approach, we compare the distance in the screen coordinate of the projection of two adjacent points of the block.

9 Claims, 15 Drawing Sheets

(56) References Cited

OTHER PUBLICATIONS

Kyungjin, “Volumetric Video Delivery on Mobile Devices”, Department of Electrical Engineering and Computer Science College of Engineering Seoul National University, Feb. 2020, 61 pages.
Anonymous, “Test Model 5 for Immersive Video”, 130. MPEG, ISO/IEC JTC 1/SC/ 29/WG 11, N19213, May 16, 2020, 35 pages.

* cited by examiner

DYNAMIC BLOCK DECIMATION IN V-PCC DECODER

CROSS REFERENCE TO RELATED APPLICATIONS

This application is a U.S. National Stage Application under 35 U.S.C. 371 of International Patent Application No. PCT/EP2023/057567 filed Mar. 23, 2023, which is incorporated herein by reference in its entirety.

This application claims the benefit of European Patent Application No. 22305539.3 filed Apr. 13, 2022, which is incorporated herein by reference in its entirety.

TECHNICAL FIELD

The present embodiments generally relate to a method and an apparatus for video coding and rendering of point clouds.

BACKGROUND

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever and is expected to be an ultimate enabler in the applications discussed herein.

SUMMARY

According to one embodiment, a method of processing point cloud data is provided, comprising: obtaining rendering information from a renderer; selecting a resolution at which a part of a geometry image is to be reconstructed, based on said rendering information; reconstructing said part at said selected resolution; and outputting said reconstructed part to said renderer.

According to another embodiment, an apparatus for processing point cloud data is provided, comprising one or more processors and at least one memory coupled to said one or more processors, wherein said one or more processors are configured to: obtain rendering information from a renderer; select a resolution at which a part of a geometry image is to be reconstructed, based on said rendering information; reconstruct said part at said selected resolution; and output said reconstructed part to said renderer.

One or more embodiments also provide a computer program comprising instructions which when executed by one or more processors cause the one or more processors to perform the method according to any of the embodiments described herein. One or more of the present embodiments also provide a computer readable storage medium having stored thereon instructions for processing point cloud data according to the methods described herein.

DETAILED DESCRIPTION

Figure 1:
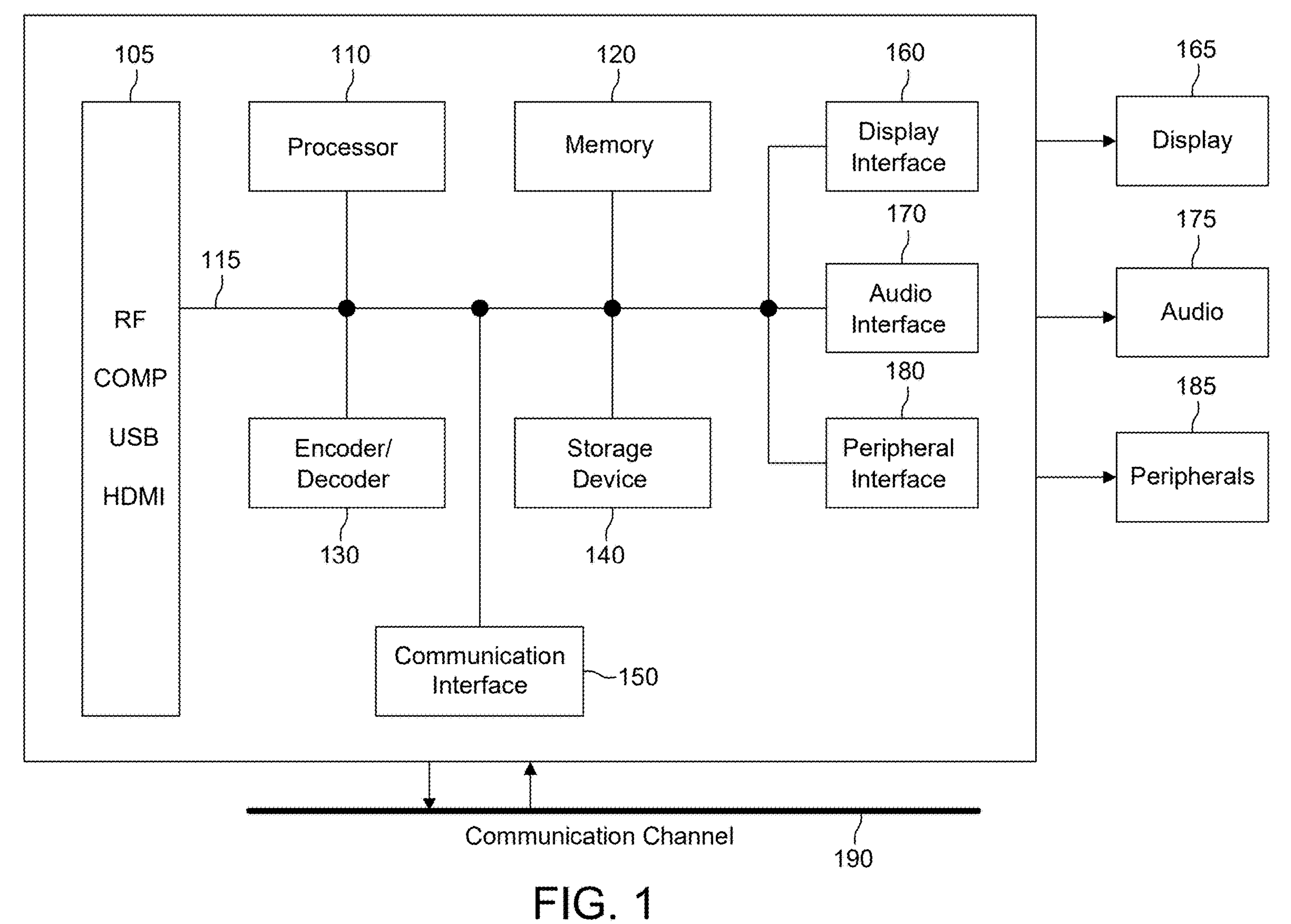
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, JPEG Pleno, MPEG-I, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
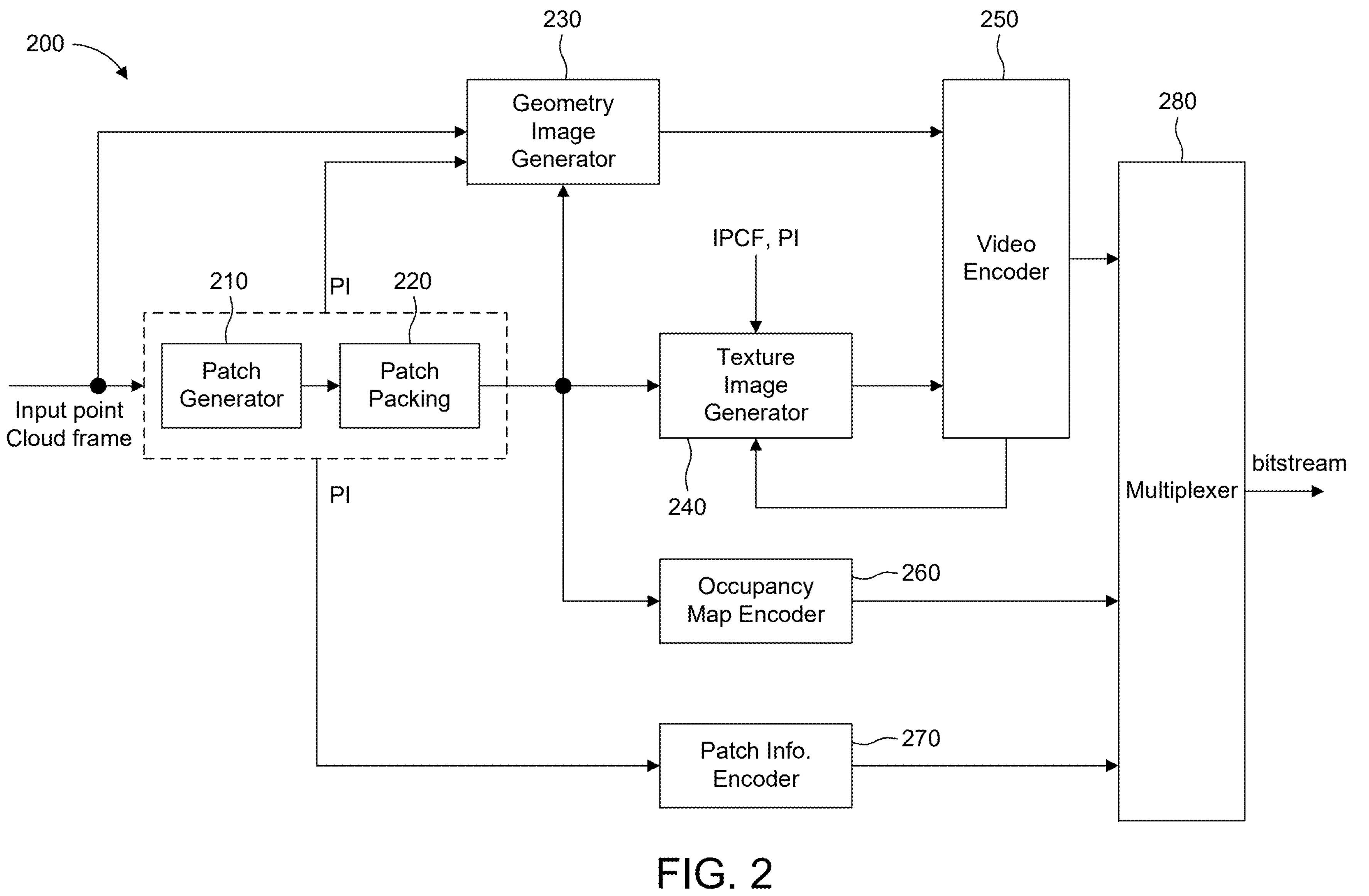
FIG. 2 illustrates a schematic block diagram of an example of an image-based point cloud encoder.
Figure 7:
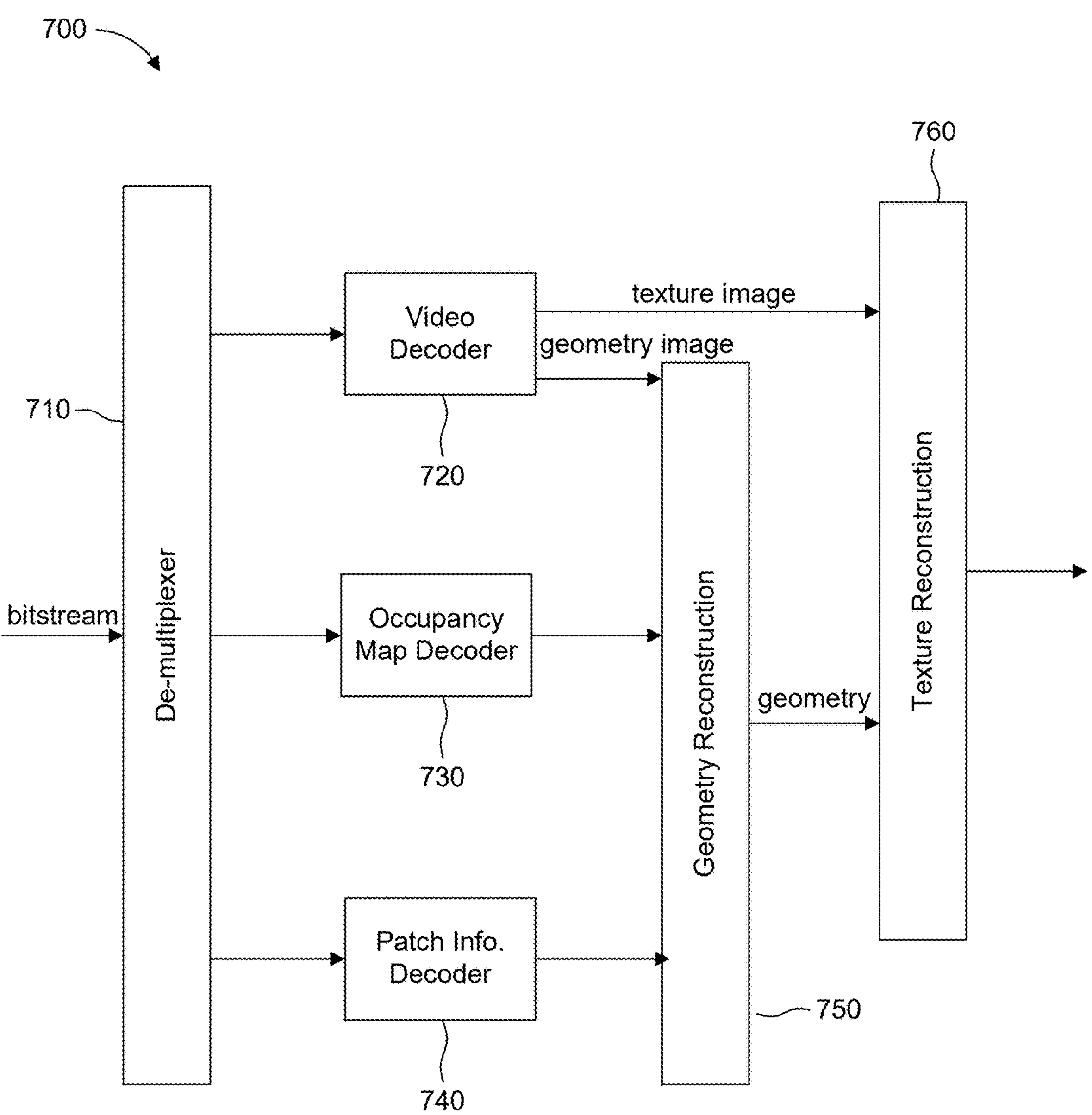
FIG. 7 illustrates a schematic block diagram of an example of an image-based point cloud decoder.

FIG. 2 illustrates a schematic block diagram of an example of an image-based point cloud encoder. Encoder 200 may provide geometry/texture images representing the geometry/attributes of 3D samples of the input point cloud frame (IPCF). The bitstream generated by encoder 200 may be decoded by an image-based decoder 700 as illustrated in FIG. 7 that may provide a reconstructed point cloud frame.

The image-based point cloud encoder 200 leverages existing video codecs to compress the geometry and texture (attribute) information of a dynamic point cloud. This is accomplished by essentially converting the point cloud data into a set of different video sequences.

In one embodiment, two videos, one for capturing the geometry information of the point cloud data and another for capturing the texture information, may be generated and compressed using existing video codecs, for example, an HEVC Main profile encoder/decoder.

Additional metadata that are used to interpret the two videos are typically also generated and compressed separately. Such additional metadata includes, for example, an occupancy map and/or auxiliary patch information (PI).

The generated video bitstreams and the metadata may then be multiplexed together so as to generate a combined bitstream.

An example of such a point cloud coding/decoding process is given in Text of ISO/IEC FDIS 23090-5 Visual Volumetric Video-based Coding and Video-based point cloud compression, ISO/IEC JTC 1/SC 29/WG 11/MPEG-I 3DG, w19579.

In particular, a patch generator (210) may generate at least one patch by decomposing 3D samples of a data set representative of the input point cloud frame (IPCF) to 2D samples on a projection plane, for example, using a strategy that provides best compression. A patch may be defined as a set of 2D samples.

Figure 3B:
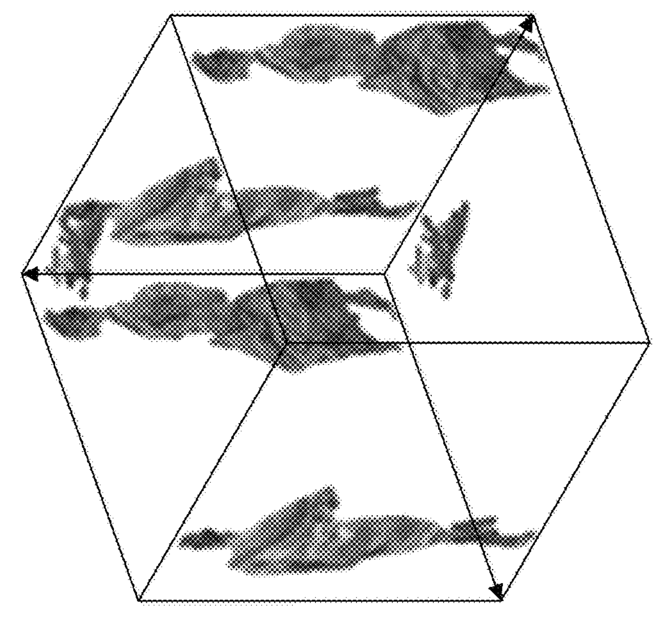
FIG. 3B illustrates projected pixels in 2D images.
Figure 3A:
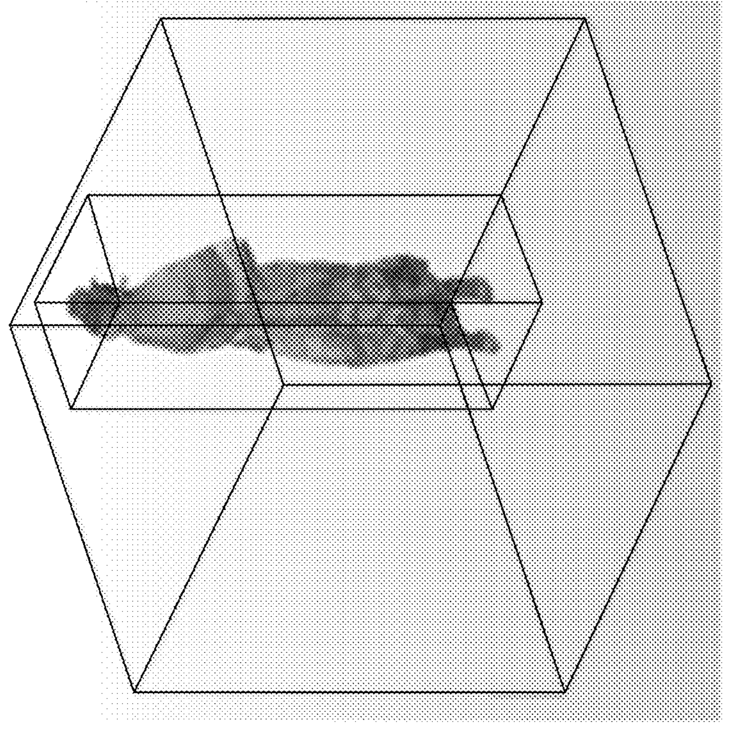
FIG. 3A illustrates an example of points in 3D space.

For example, in V-PCC, a normal at every 3D sample is first estimated. Next, an initial clustering of the input point cloud frame is obtained by associating each 3D sample with one of the six oriented planes of a 3D bounding box encompassing the 3D samples of the input point cloud frame. More particularly, each 3D sample is clustered and associated with an oriented plane that has the closest normal (that is, maximizes the dot product of the point normal and the plane normal). Then the 3D samples are projected to their associated planes, for example, points in 3D space as illustrated in FIG. 3A are projected to pixels in 2D images as illustrated in FIG. 3B.

Figure 4B:
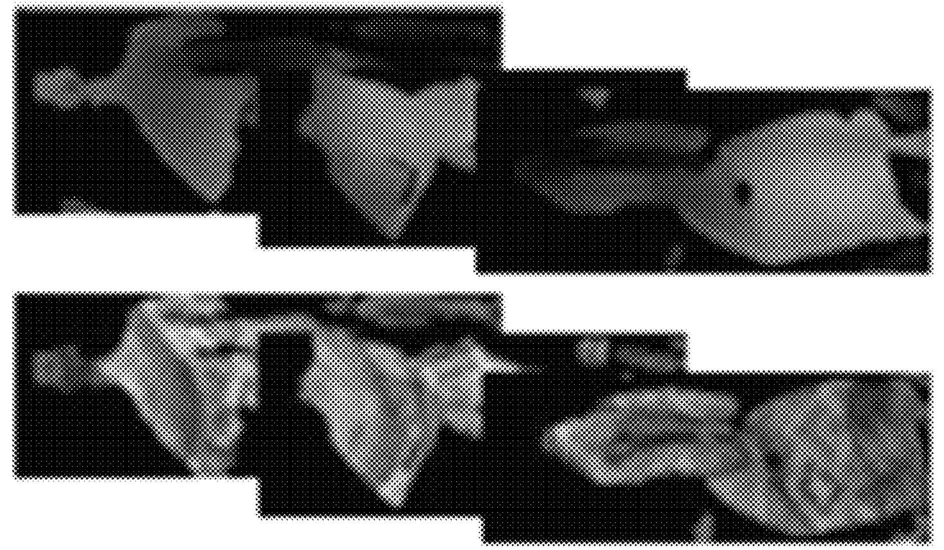
FIG. 4B illustrates projection of each cluster to 2D patches.
Figure 4A:
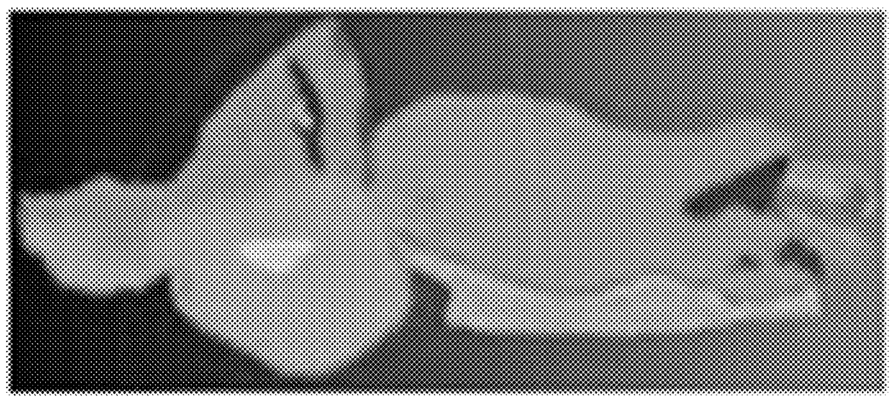
FIG. 4A illustrates an example of clustering of 3D points.

A set of 3D samples that forms a connected area in their plane is referred as a connected component. A connected component is a set of at least one 3D sample having similar normal and a same associated oriented plane. The initial clustering is then refined by iteratively updating the cluster associated with each 3D sample based on its normal and the clusters of its nearest neighboring samples. One patch is generated from each connected component, which is done by projecting the 3D samples of each connected component onto the oriented plane associated with said connected component. A patch is associated with auxiliary patch information PI that represents auxiliary patch information defined for each patch to interpret the projected 2D samples that correspond to the geometry and/or attribute information. FIG. 4A illustrates the clustering of 3D points, and FIG. 4B illustrates projection of each cluster to 2D patch.

In V-PCC, for example, the auxiliary patch information PI includes (1) information indicating one of the six oriented planes of a 3D bounding box encompassing the 3D samples of a connected component; (2) information relative to the plane normal; (3) information determining the 3D location of a connected component relative to a patch represented in terms of depth, tangential shift and bi-tangential shift; and (4) information such as coordinates (u0, v0, u1, v1) in a projection plane defining a 2D bounding box encompassing a patch.

A patch packing module (220) may map (place) at least one generated patch onto a 2D grid (also called canvas) in a manner that typically minimizes the unused space, and may guarantee that every T×T (for example, 16×16) block of the 2D grid is associated with a unique patch. A given minimum block size T×T of the 2D grid may specify the minimum distance between distinct patches as placed on this 2D grid. The 2D grid resolution may depend on the input point cloud size and its width W and height H and the block size T may be transmitted as metadata to the decoder.

The auxiliary patch information (PI) may further include information relative to an association between a block of the 2D grid and a patch. In V-PCC, the auxiliary information PI may include a block-to-patch-index information (BlockToPatch) that determines an association between a block of the 2D grid and a patch index.

Figure 5:
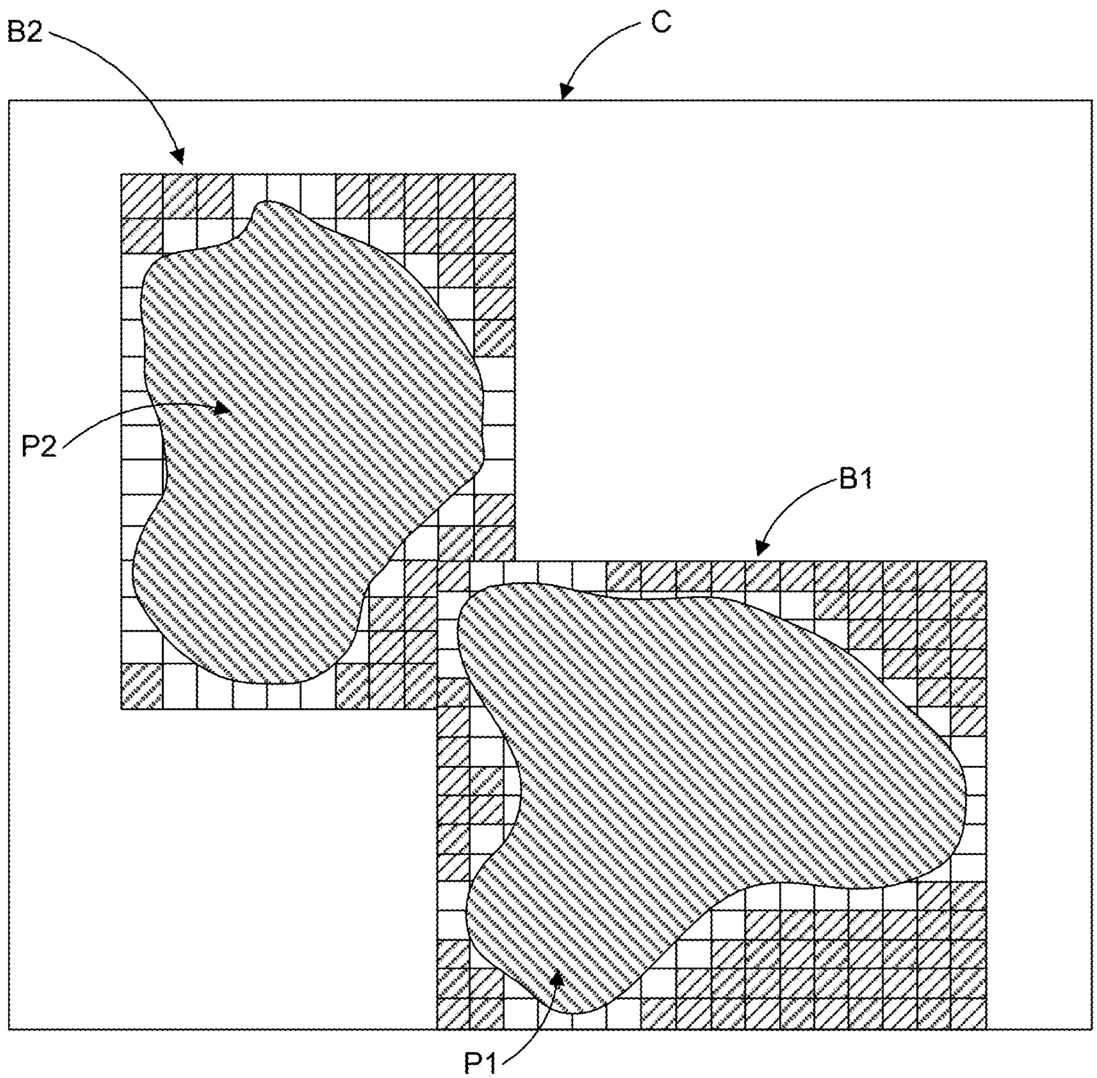
FIG. 5 illustrates an example of a canvas C comprising 2 patches P1 and P2 and their associated 2D bounding boxes B1 and B2.

FIG. 5 illustrates an example of a canvas C comprising 2 patches P1 and P2 and their associated 2D bounding boxes B1 and B2. Note that two bounding boxes may overlap in the canvas C as illustrated on FIG. 5. The 2D grid (the splitting of the canvas) is only represented inside the bounding box but the splitting of the canvas also occurs outside those bounding boxes. A bounding box associated with a patch can be split into T×T blocks, typically T=16.

T×T blocks containing 2D samples belonging to a patch may be considered as occupied blocks. Each occupied block of the canvas is represented by a particular pixel value (for example 1) in the occupancy map (three-channels image) and each unoccupied block of the canvas is represented by another particular value, for example 0. Then, a pixel value of the occupancy map may indicate whether a T×T block of the canvas is occupied, that is, contains 2D samples that belong to a patch.

In FIG. 5, an occupied block is represented by a white block and hatched blocks represent unoccupied blocks. The image generation processes exploit the mapping of the generated patch(es) onto the 2D grid computed during patch packing, to store the geometry and texture of the input point cloud frame IPCF as images. A geometry image may represent the geometry of the input point cloud frame IPCF and may be a monochromatic image of W×H pixels represented, for example, in YUV420-8 bit format. A texture image is a three-channel image that may represent the texture of the input point cloud frame IPCF and may be an image of W×H pixels represented, for example, in YUV420-8 bit format or in RGB444-8 bit format.

In particular, a geometry image generator (230) may generate at least one geometry image from the input point cloud frame, the occupancy map and the auxiliary patch information. The geometry image generator (230) may exploit the occupancy map information in order to detect (locate) the occupied blocks and thus the non-empty pixels in the geometry image.

In order to better handle the case of multiple 3D samples being projected (mapped) to a same 2D sample of the projection plane (along a same projection direction (line)), multiple images, referred to as layers, may be generated. Thus, different depth values D1, . . . , Dn may be associated with a 2D sample of a patch and multiple geometry images may then be generated.

In V-PCC, 2D samples of a patch are projected onto two layers. A first layer, also called the near layer, may store, for example, the depth values D0 associated with the 2D samples with smaller depths. A second layer, referred to as the far layer, may store, for example, the depth values D1 associated with the 2D samples with larger depths. Alternatively, the second layer may store difference values between depth values D1 and D0.

A texture image generator (240) may generate at least one texture image from the input point cloud frame IPCF, the occupancy map, the auxiliary patch information PI and a geometry of a reconstructed point cloud frame derived from at least one decoded geometry image.

The texture image generator may exploit the occupancy map information in order to detect (locate) the occupied blocks and thus the non-empty pixels in the texture image. The texture image generator may be adapted to generate and associate a texture image with each geometry image/layer.

According to an embodiment, the texture image generator (240) may code (store) the texture (attribute) values TO associated with 2D samples of the first layer as pixel values of a first texture image TI0 and the texture values T1 associated with the 2D samples of the second layer as pixel values of a second texture image TI1.

Figure 6C:
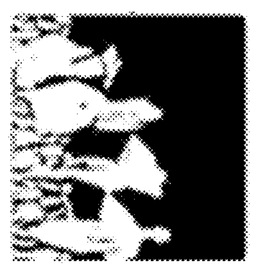
FIG. 6C illustrates an example of an occupancy map.
Figure 6B:
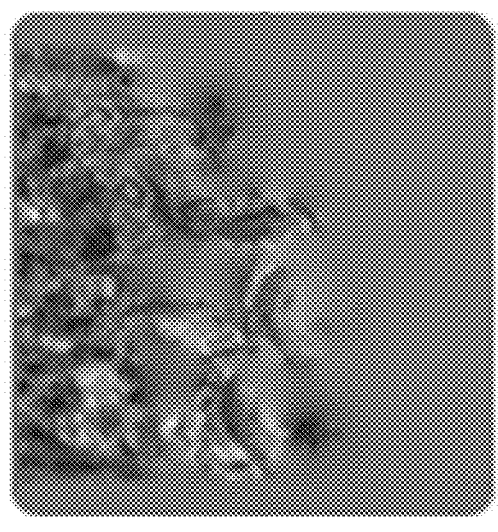
FIG. 6B illustrates an example of a texture image.
Figure 6A:
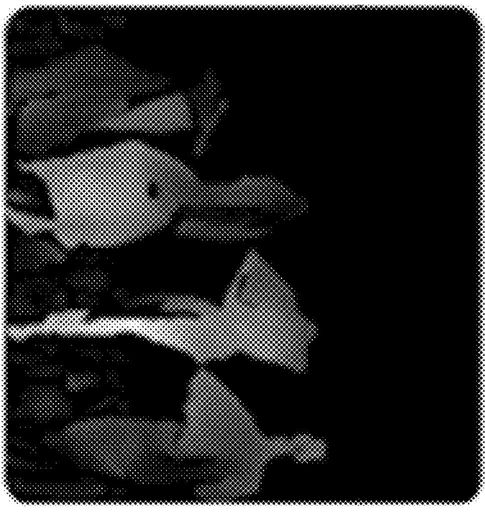
FIG. 6A illustrates an example of a geometry image.

Alternatively, the texture image generating module (240) may code (store) the texture values T1 associated with 2D samples of the second layer as pixel values of the first texture image TI0 and the texture values D0 associated with the 2D samples of the first layer as pixel values of the second geometry image GI1. For example, FIG. 6A illustrates a geometry image, FIG. 6B illustrates a texture image, and FIG. 6C illustrates an occupancy map.

According to an embodiment, a padding process may be applied to the geometry and/or texture image. The padding process may be used to fill empty space between patches to generate a piecewise smooth image suited for video compression.

A video encoder (250) may encode the generated geometry images and texture images. According to an embodiment, the video encoder (250) and/or occupancy map encoder (260) may be a HEVC-based encoder. An occupancy map encoder (260) may encode the occupancy map as an image as detailed, for example, in section H.9.3 Occupancy video decoding process in w19579. Lossy or lossless encoding may be used.

A patch information encoder (270) may encode the auxiliary patch information and possibly additional metadata such as the block size T, the width W and height H of the geometry/texture images. According to an embodiment, the auxiliary patch information may be differentially encoded (as defined, for example in section H.9.6 sub-bitstream extraction process in w19579).

A multiplexer (280) may be applied to the generated outputs of the video encoder (250), the occupancy map encoder (260) and the patch information encoder (270), and as a result these outputs may be multiplexed together so as to generate a bitstream. It should be noted that the metadata information usually represents a small fraction of the overall bitstream, and the bulk of the information is compressed using the video codecs.

FIG. 7 illustrates a schematic block diagram of an example of an image-based point cloud decoder 700 in accordance with an embodiment.

In particular, a de-multiplexer (710) may be applied to demultiplex the encoded information of the bitstream, for example, generated by an image-based point cloud encoder (200). Then, a video decoder (720) may decode encoded information to derive at least one decoded geometry image and at least one decoded texture image. An occupancy map decoder (730) may decode encoded information to derive a decoded occupancy map. According to an embodiment, the video decoder and/or the occupancy map decoder may be a HEVC-based decoder. A patch information decoder (740) may decode encoded information to derive auxiliary patch information. Possibly, metadata may also be derived from the bitstream.

A geometry reconstruction module (750) may derive the geometry of a reconstructed point cloud frame from the at least one decoded geometry image, the decoded occupancy map, the decoded auxiliary patch information and possible additional metadata. The geometry reconstruction module (750) may exploit the decoded occupancy map information in order to locate the non-empty pixels in the at least one decoded geometry image.

A texture reconstruction module (760) may derive the texture of the reconstructed point cloud frame from the geometry and the at least one decoded texture image. The texture reconstruction module (760) may derive the texture of non-empty pixels.

The decoded point cloud, decoded by the geometry reconstruction module (750) and the texture reconstruction module (760), is transmitted to the rendering engine which, depending on the position of the user and the parameters of the camera renders the point cloud to the screen and displays it to the user.

When rendering a V-PCC point cloud, the number of points (or vertices) to render can dramatically impact the performance of the application, typically on less than high-end mobile devices or on computationally intensive hardware like Mixed Reality glasses. Reducing the number of points to render ensures a real time execution but generates a loss in the perceptual quality.

The rendering of a large point cloud on a limited memory device could be performed in various ways by downscaling the point cloud to allow to load in memory all the points and make possible the rendering. Other methods propose to split a large model in several 3D boxes/regions and store each sub-point cloud at various resolution. This allows, during the rendering phase, to choose which resolution is used for each region according to the user position to the camera. These methods optimize the rendering of the point cloud but do not change the decoding process.

To guarantee a real time application and a good user experience, we propose to decode and reconstruct the V-PCC bitstreams by different ways based on the position of the viewer. According to the position of the camera in charge of rendering the decoded point cloud, blocks of V-PCC patches will be decoded at variable resolutions. This process will generate fewer points for the parts that are less visible and keep all the point for the parts facing and close to the viewer. This process works on V-PCC bitstreams, but the same approach can be used to decode and render other types of bitstreams describing 3D objects or 3D scenes.

Figure 8:
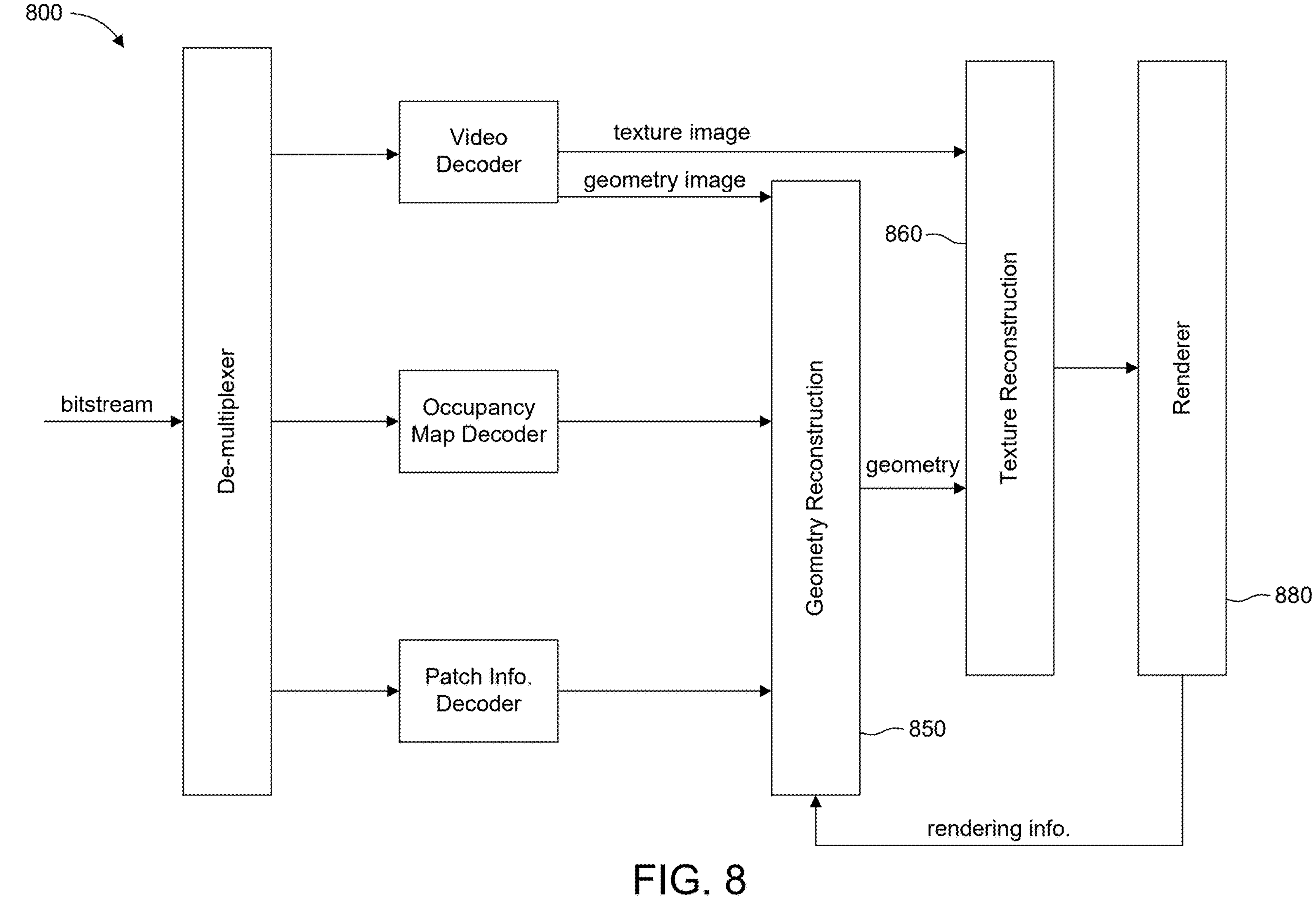
FIG. 8 illustrates a schematic block diagram of a modified image-based point cloud decoder, in accordance with an embodiment.

In the V-PCC decoder, each block is decoded independently of the other blocks of the patch, but all the pixels of the blocks are reconstructed in the same way because the patch information used by the reconstruction are coded by block. As illustrated in FIG. 8, we propose to change the geometry reconstruction process (850) by dynamically reducing the resolution of blocks given their reconstructed positions in the projection space, directly allowing a less computationally intensive rendering of the point cloud.

As shown in FIG. 7, the V-PCC decoding and reconstruction process as specified in the V-PCC standard are performed without any information on the usage of the reconstructed point cloud during the rendering phase. In one embodiment, as shown in FIG. 8, we propose to modify the reconstruction process (850) by exploiting information about where the decoded point cloud will be rendered at the renderer (880). In this embodiment, the decoder (800) does not decode or generate all points if the points are not present or visible in the rendered scene, or if the decimation does not have a significant impact on the perceived visual quality of rendering while reducing the computational load.

Figures 9A, 9B, 9C:
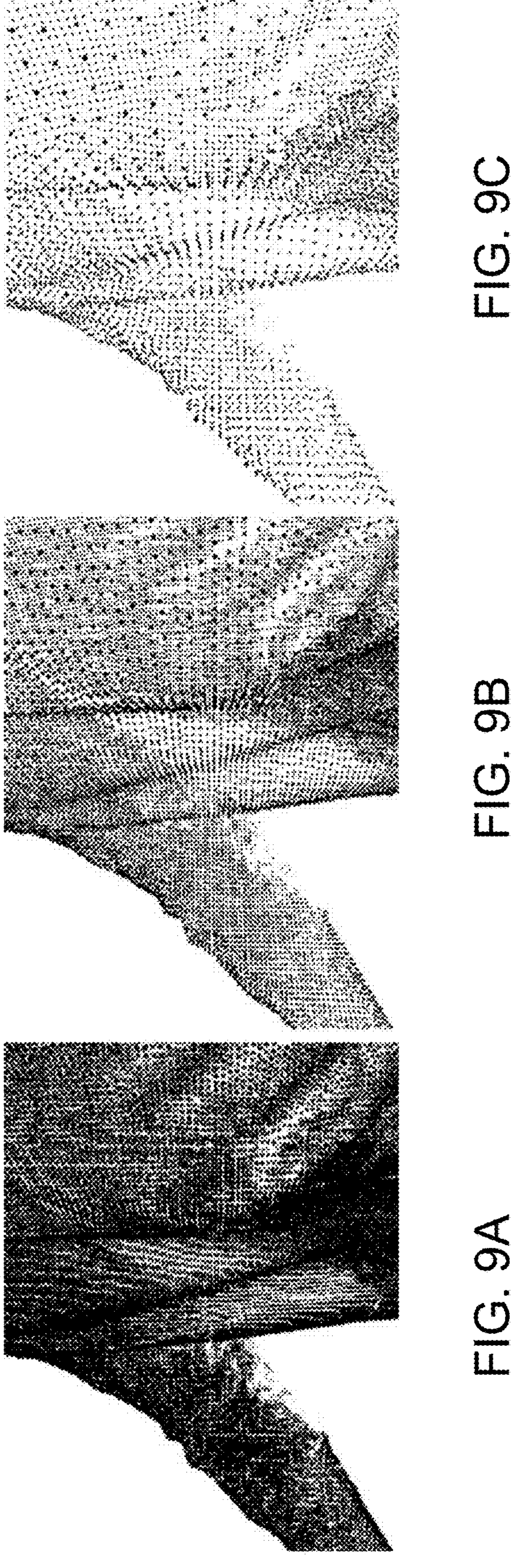
FIG. 9A, FIG. 9B and FIG. 9C illustrate an example of point cloud rendering at various resolutions.

Each block could be reconstructed at various resolutions, or decimation levels, as shown in FIG. 9A, FIG. 9B and FIG. 9C. For example, for a 16×16 block at various levels of decimation, the number of points will be:

Decimation level 0: 16×16=256

Decimation level 1: 8×8=64

Decimation level 2: 4×4=16

Decimation level 3: 2×2=4

Decimation level 4: 1×1=1

Decimation level 5: 0×0=0 (no reconstruction).

The texture reconstruction process (860) assigns a color to each reconstructed point. Based on the chosen decimation level, fewer points will be generated by the geometry reconstruction process (850), and in this case fewer points will be colored by the texture reconstruction process (860) but this process itself is not changed.

The decimation ratios for the horizontal and vertical directions can also be different, and there can be separate decimation levels for the horizontal and vertical directions. For example, the number of points can be controlled by a horizontal decimation level and a vertical decimation level.

Figure 10:
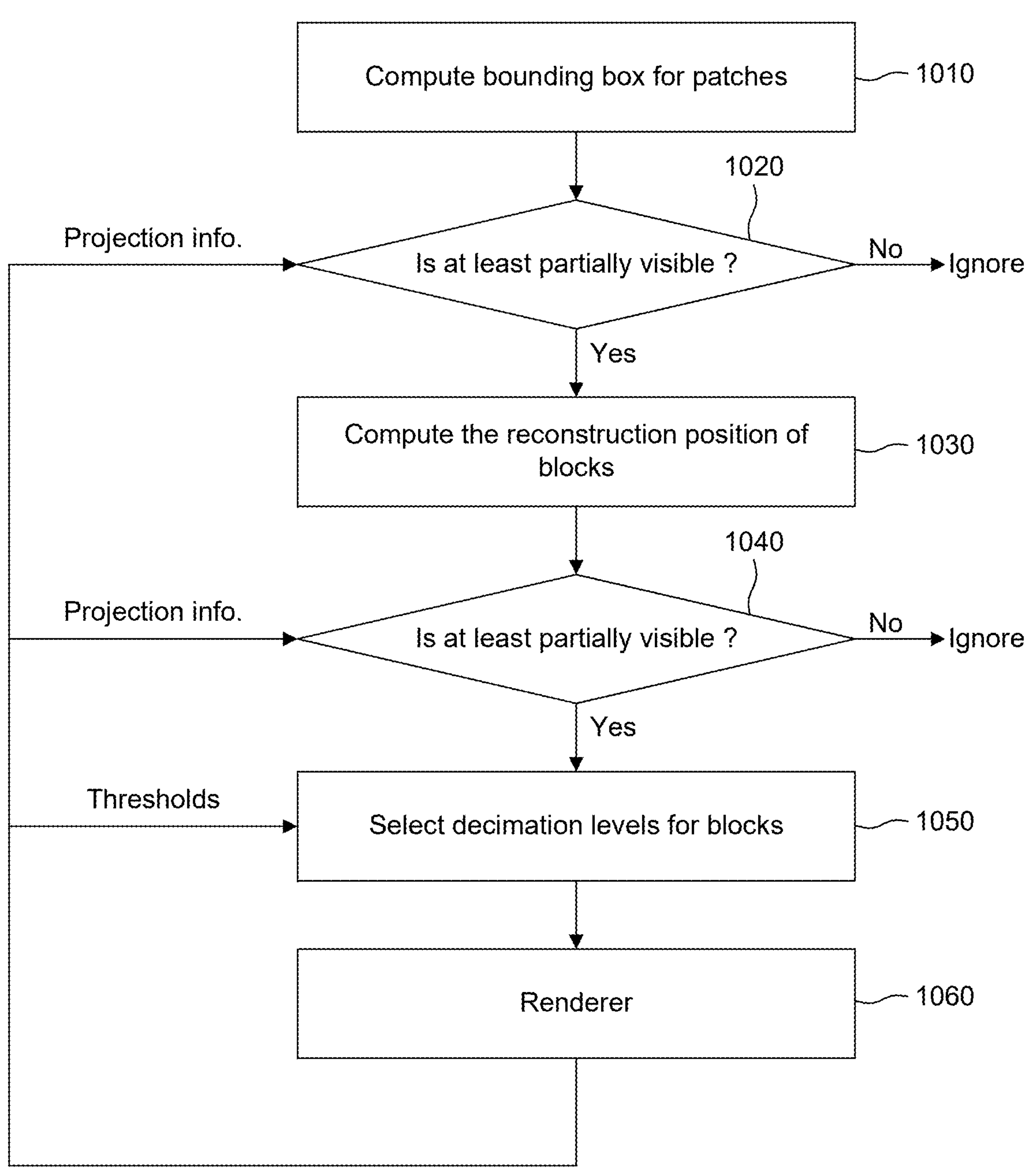
FIG. 10 illustrates a modified reconstruction process, according to an embodiment.

Based on the rendering information transmitted by the renderer, it is possible to evaluate for each patch, for each block component of patches, or for each pixel of the patches, if the corresponding reconstructed point will be viewed by the user after the rendering process and which decimation level could be selected without impairing significantly the rendering quality. Based on the evaluation results, it is possible to decide whether to render or not the current area and at which resolution. In the following, we propose to perform the proposed method at 16×16 block and set for each block a decimation level at which the block must be rendered. The choice to use 16×16 blocks was made because V-PCC bitstreams by default use 16×16 block sizes to describe patches. The proposed process can be executed with other block sizes and the choice of the block size used can be taken according to the complexity of the process. For example, if the size is small the process to choose the level of decimation will be executed several times, and the fidelity of the reconstruction; if the size of the block is too large, the level of decimation chosen will not be correct for all parts of the block FIG. 10 illustrates the modified reconstruction process in a V-PCC decoder, according to an embodiment. In this embodiment, the rendering information is transmitted to the V-PCC decoder, which can be used to calculate whether the points will be visible in the screen space. At step 1010, the 3D bounding boxes of the patches are built. At step 1020, it is evaluated whether a patch will be at least partially visible. If the patch will be completely invisible, then it is not to be rendered (rendering ignored). Otherwise, if the patch will be partially or completely visible, at step 1030, each 16×16 block in the patch is considered.

In particular, at step 1030, the reconstructed position of a block in the screen space is computed. At step 1040, it is evaluated whether a patch will be at least partially visible. If the block will be completely invisible, then it is not to be rendered. Otherwise, if the block will be partially or completely visible, at step 1050, the decimation levels are selected for the block and the block is reconstructed at the selected decimation level. The reconstructed point cloud is then rendered by a renderer (1060). In the following, the steps will be described in further detail.

Rendering Information

As illustrated in FIG. 8, the information used to render the point cloud is transmitted to the V-PCC point cloud decoder. The transmitted rendering information may include information about matrices used to transform the point from the model coordinates to the world coordinates, to the view coordinates and to the clip coordinates, namely, model matrix, view matrix, projection matrix, viewport matrix.

Figure 11:
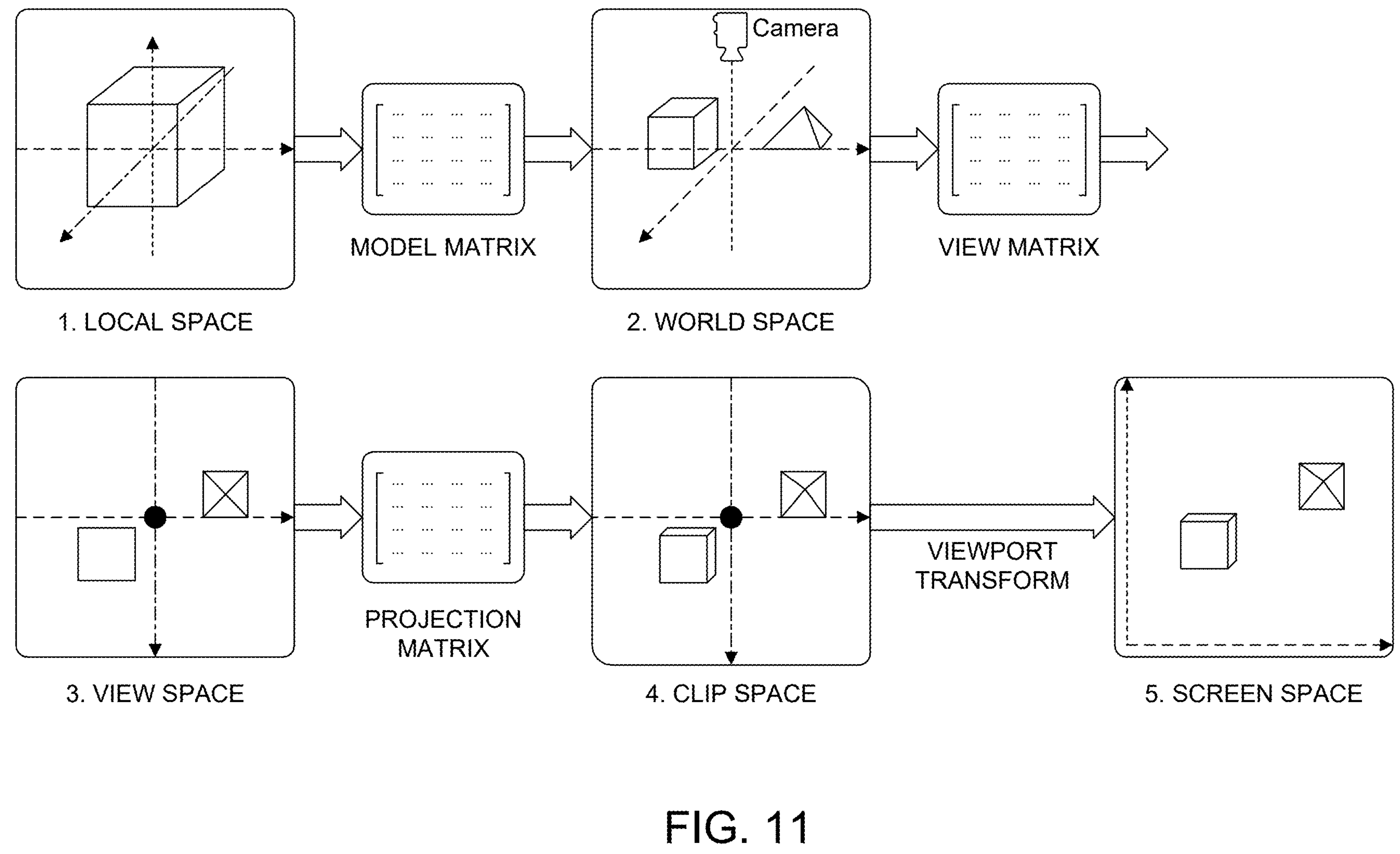
FIG. 11 shows an example of the transformation matrices and the coordinate spaces used during the rendering processes.

FIG. 11 shows an example of the transformation matrices and the coordinate spaces used during the rendering processes. In FIG. 11, the vertex coordinates first start in local space as local coordinates, and then are processed to world coordinates in world space, view coordinates in view space, clip coordinates in clip space and eventually end up as screen coordinates in screen space, by using the model matrix, view matrix, projection matrix, and viewport matrix, respectively. Local coordinates are the coordinates of the object relative to its local origin, world-space coordinates are coordinates in respect of a larger world. These coordinates are relative to some global origin of the world, together with many other objects also placed relative to this world's origin. In view-space coordinates, each coordinate is as seen from the camera or viewer's point of view. Clip coordinates are in the −1.0 and 1.0 range and is used to determine which vertices will end up on the screen.

As described above, the rendering information is used by the renderer to project the points that need to be rendered to the pixels of the display screen. They can be transmitted from the renderer to the decoder, for example, per frame. With this additional information, the decoder can estimate where the points will be displayed before reconstruction and modify the reconstruction process based on the rendering information.

The coordinates of the 3D reconstruction point, $(x, y, z)_{local}$, can be transformed to the screen space coordinates: $(x', y', z')_{screen}$, for example, by performing the following linear transformation:

$$(x', y', z', w)_{screen} = M_{viewport} \cdot M_{projection} \cdot M_{view} \cdot M_{model} \cdot (x, y, z, 1)_{local}$$

where the points are expressed in homogenous coordinate, noted (x, y, z, w). The reconstructed point $(x, y, z)_{local}$ can be represented in homogenous coordinates: $(x, y, z, 1)_{local}$ and can be easily transformed by matrix multiplications, even a projection transform, to a screen coordinate expresses in homogenous coordinate $(x', y', z', w)_{screen}$. The cartesian coordinate can then be obtained by dividing the x and y components of the vector by w, and we get the screen coordinates (x', y') equal to $(y'/w, y'/w)_{screen}$.

In the screen space, (x', y') correspond to the coordinate of the pixel of the screen in range [0; screen width]×[0; screen height], where the 3D point will be displayed, and the z' coordinate contains the normalized depth value between [−1; 1] corresponding to the distance between the 3D point and the screen, normalized with the near plane and the far plane values defined by the camera parameters. In the screen space, if $(x', y', z')_{screen}$ are outside the ranges the point will not be displayed on the screen.

Evaluation for Patches

Figure 12A:
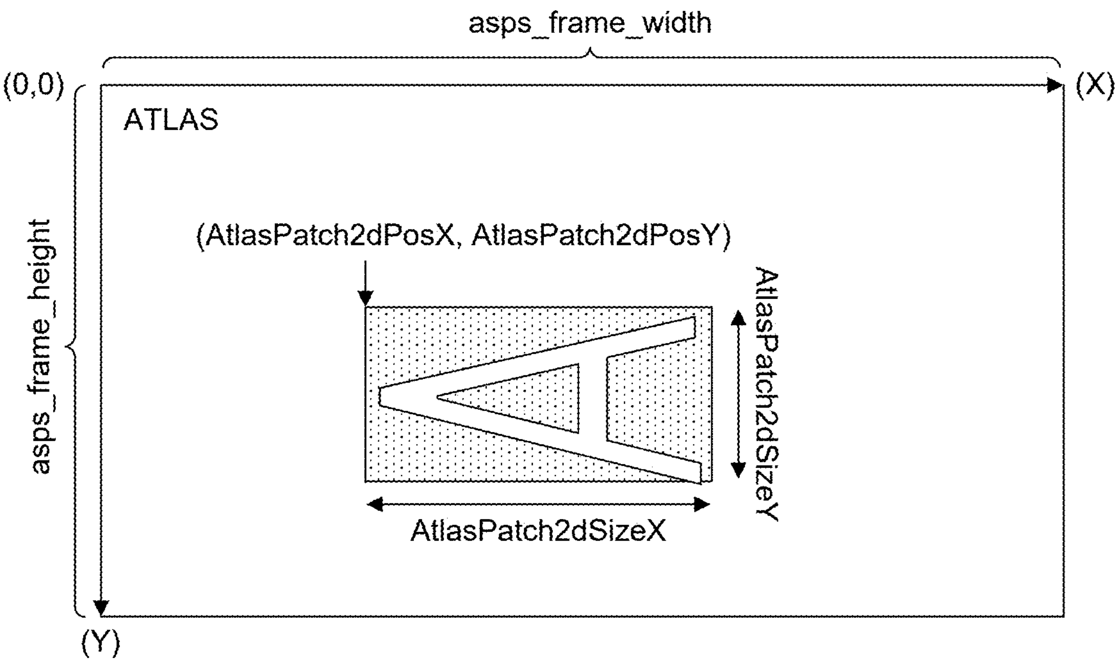
FIG. 12A illustrates an atlas coordinate system.
Figure 12B:
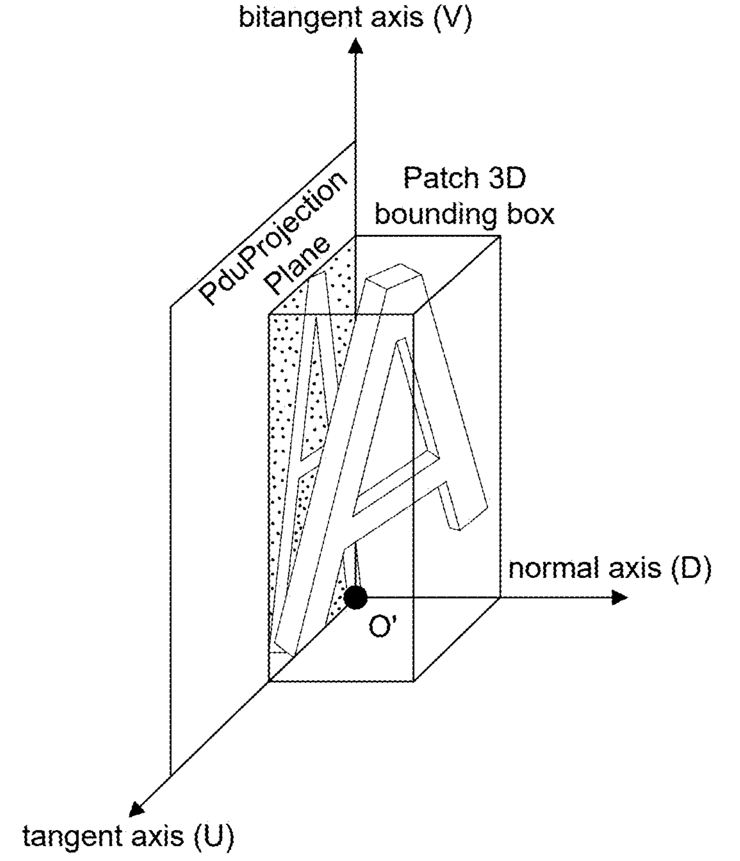
FIG. 12B illustrates a local 3D patch coordinate system.
Figure 12C:
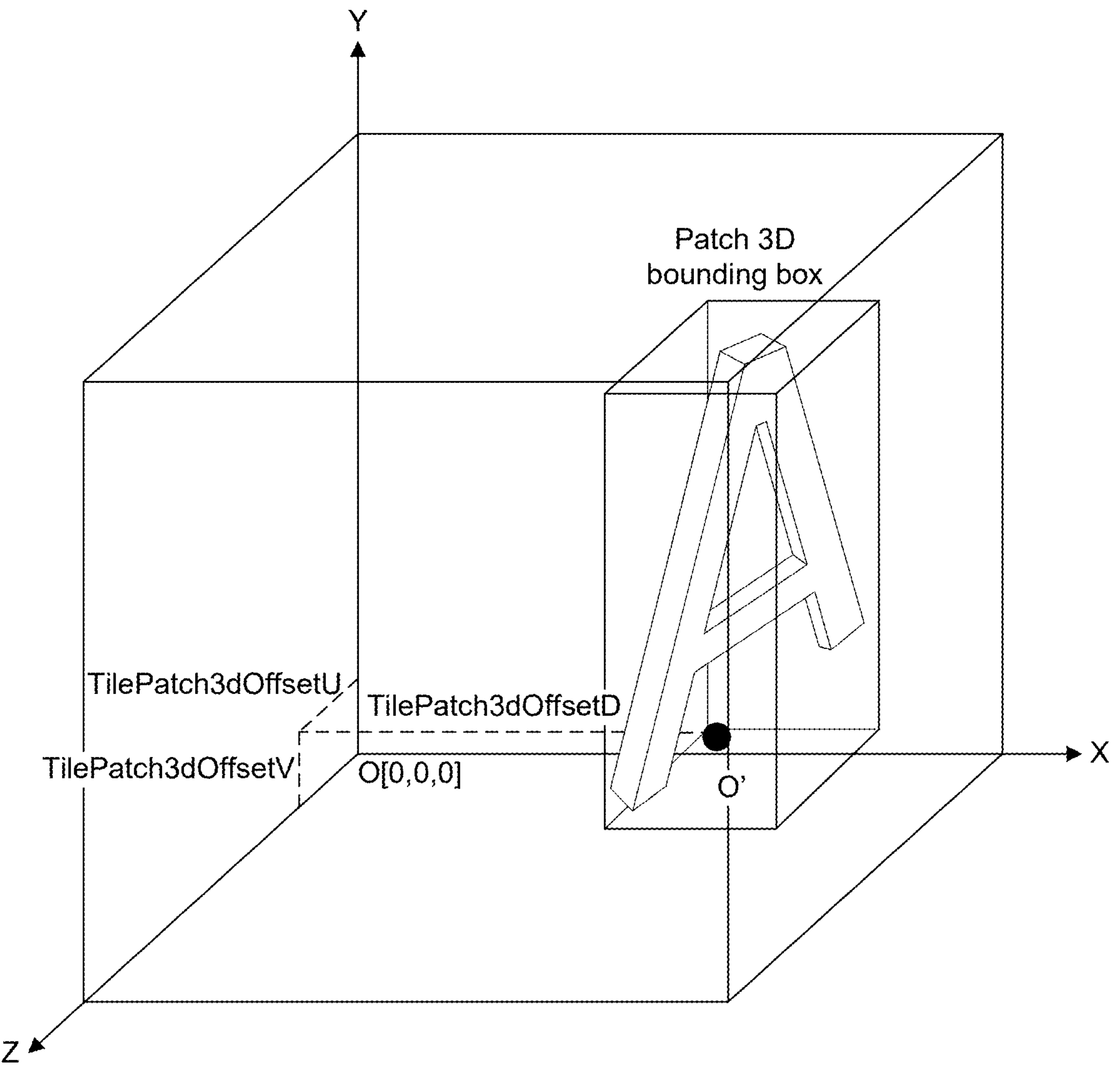
FIG. 12C illustrates a final target 3D coordinate system.

The 3D bounding boxes of the patches are built (1010) and evaluated (1020) in the screen space to determine if the patch needs to be renderer of not. As shown in FIG. 12 which describes examples of (a) an atlas coordinate system, (b) a local 3D patch coordinate system, and (c) final target 3D coordinate system, the following decoded patch data are used to build the bounding boxes coordinate in model space (local space):

TilePatch2dPosX, TilePatch2dPosY,
TilePatch2dSizeX, TilePatch2dSizeY,
TilePatch3dOffsetU, TilePatch3dOffsetV, TilePatch3dOffsetD,
TilePatch3dRangeD,
TilePatchProjectionID,
TilePatchOrientationIndex.

Figure 13B:
FIG. 13A and FIG. 13B illustrate an example of the 3D bounding boxes of the patches of the V-PCC decoded point clouds.
Figure 13A:
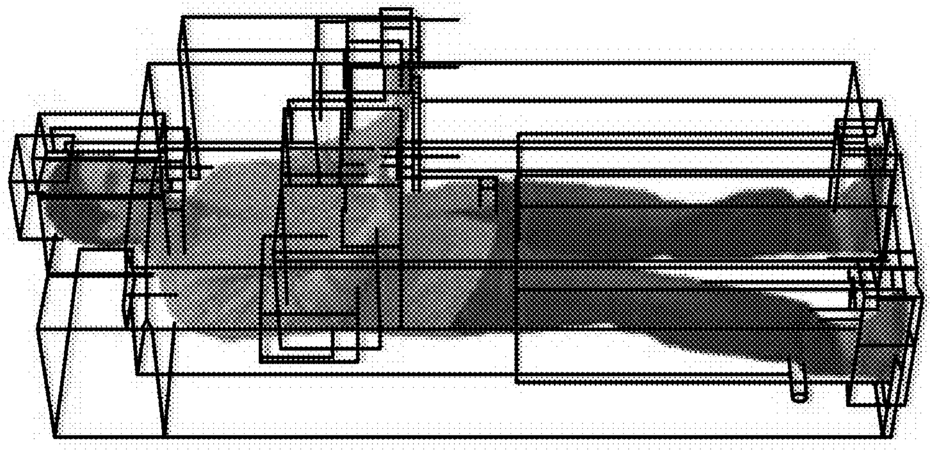

FIG. 13A and FIG. 13B show an example of the 3D bounding boxes of the patches of the V-PCC decoded point clouds.

The 3D patch bounding box information could be used to decide if the current patch is to be rendered or not. The projections of the eight 3D points, that define the 3D bounding box, in the screen space can be used to cull the patch if its projected area does not intersect the screen.

In addition to the processes described in the following steps, the distances between the eight projected points of the bounding box of a patch in the screen space could give a first approximation of the decimation that should be used to render the blocks of the patch.

Evaluation for Blocks

During the decoding process, each individual 16×16 pixel block in the patch area is considered. For each block, the reconstructed position of the block is computed (1030) in the screen space ($Rec_{screen}$) using the patch metadata, the occupancy map values, the geometry values, and the camera information. An approximation of the position of the reconstructed point(s) in the screen space and in particular the distance(s) to the screen can be used to choose the decimation level of the block.

The reconstructed point in the screen space is defined as the coordinate $(x, y, z)_{screen}$, where (x,y) are the coordinates of the pixel of the screen where the point will be displayed. The z coordinate corresponds to the normalized distance between $Rec_{local}$, the 3D reconstructed point in the model space, and the camera.

Different approaches can be used to compute the reconstructed position(s). The easiest way (which reduces the computation load) is to consider only one point, ideally near the center of the block, as in most situations there are not large variations within each block. A limitation of this method is that a single point may not be representative of the whole block (local singularity such as sharp spike or hole for example). But this is a tradeoff between complexity and quality. It is also possible to use the average of multiple positions to limit the singularity effect. A subsampling of values within the block could be defined, the main tradeoff being the number of points to consider and the computation load. The computation could also be performed by considering all pixels within the block, then computing an exact bounding box for the block.

The 16×16 blocks can be not fully occupied, and it is not sure that the 4 corners pixels of the blocks are occupied. But as geometry data is padded for better compression, points are guaranteed to be in a somewhat coherent position regarding the rest of the block, even if they are not actually part of the model. So, the methods described above could be used even if the block is not fully occupied, while a better result would be obtained using only occupied points to compute the reconstructed positions (but this requires fetching occupancy map data for each point to know if those are occupied or not).

Selection of Decimation Levels

The analysis of the $(x, y, z)_{screen}$ coordinate of the reconstructed point in the screen space can be done to detect whether to render the block or not, and to select (1050) the resolution of the block (decimation level) if rendered (1060).

In the following, we present two approaches to choose the decimation level according to the projected point coordinates $(x, y, z)_{screen}$. In the first approach, we compare the distance to the screen ($z_{screen}$) to a ranges of distance thresholds. In the second approach, we compare the (x,y) distance in the screen coordinate of the projection of two adjacent points of the block.

According to the V-PCC specification, unused blocks are directly discarded when the block to patch index of the block is not defined because the current block is not in a patch and then must not be rendered.

We can cull the complete block when the projected point is outside of the viewport, i.e., when $(x,y)_{screen}$ is not within [0; $Width_{screen}$]×[0; $Height_{screen}$]. It improves rendering performance but may cull partially shown blocks. Multiple approaches can be devised to lower the probability of culling a block that would be partially visible. In one example, we can test multiple points (in this case, ideally the four corners). In another example, we can add a margin for rendering blocks (typically 10%) to ensure that every part needed to be rendered is rendered. In this case, we can check whether $(x,y)_{screen}$ is within [$-Width_{screen}$*N %; $Width_{screen}$*(1+N %)]×[$-Height_{screen}$*N %; $Height_{screen}$*(1+N %)]).

According to the first approach, the thresholds are a set of ranges of distances. A corresponding decimation level is selected to be used to reconstruct the block, if the distance of the reconstructed position to the screen ($z_{screen}$) of the block is in the threshold range. In case multiple block points are reconstructed, the minimum $z_{screen}$ value is compared.

The number of thresholds and their corresponding depth range can be user defined, developer defined (compiled in the application), or dynamically configured based on the distance of the patch or the distance on the projected screen of the camera of two adjacent pixels of the block.

The thresholds could be fixed, where a fixed range of distances is defined for each decimation level. For example, for distances between 0 and 0.5, the decimation level is set 0; for distances between 0.5 and 0.75, the decimation level is set to 1.

The thresholds could also be adaptive, for example, based on the object size. In this case, the bounding box of the object can be used to define the range of position where the object will be rendered [min ($z_{screen}$); max ($z_{screen}$)] and, in particular, the range of the distance to the screen where the object will be. For example, if an object is positioned in the first quarter of the interval between min ($z_{screen}$) and max ($z_{screen}$), namely, in [0%, 25%]*[min ($z_{screen}$); max ($z_{screen}$)], the decimation level is set 0; if the object is positioned in the second quarter of the interval between min ($z_{screen}$) and max ($z_{screen}$), namely, in [25%, 50%]*[min ($z_{screen}$); max ($z_{screen}$)], the decimation level is set to 1.

These thresholds could also be dynamic based on rendering parameters. In particular, the thresholds could be changed dynamically to adapt the reconstructed point clouds to the performance of the display and the type of rendering point process used.

If the rendering process uses splatting to enlarge points on the screen display or any other rendering processes that increase the sizes of the areas covered by the points on the screen after projection, the threshold given to the decoder must be adjusted to compensate if the performance of the system is low (FPS, memory, GPU usage, . . . ) or if the numbers of reconstructed points are too high, the thresholds can be adapted to reconstruct fewer or more points.

In the second approach, the choice of the decimation level could be related to the distance between two projected points in the screen space coming from two adjacent points in the geometry image.

For two adjacent points in the geometry image, noted (u',v') and (u",v"), the two 3D reconstructed points in the model space will be $$(x'_{local}, y'_{local}, z'_{local},) \text{ and } (x''_{local}, y''_{local}, z''_{local}).$$

After projection, these points will be $$(x'_{screen}, y'_{screen}, z'_{screen},) \text{ and } (x''_{screen}, y''_{screen}, z''_{screen}).$$

The distance $$d(p'_{screen}, p''_{screen}) = \|(x'_{screen} - x''_{screen}) + (y'_{screen} - y''_{screen})\|$$

could be computed (distance L1 or L2 could be used according to the desired complexity of the process).

$$d(p'_{screen}, p''_{screen})$$

represents the distance in screen space of two adjacent points of the block and is a good approximation of the screen area that will be covered by the block. If this value is less than 1 (1 pixel or more per point implying full resolution in this case), the level of decimation is chosen with the following formula:

$$\frac{\alpha}{2^n} \le d(p'_{screen}, p''_{screen}) < \frac{\alpha}{2^{n-1}}$$

From which we get:

$$n = \left\lceil \log_2\left(\frac{\alpha}{d(p'_{screen}, p''_{screen})}\right) \right\rceil$$

where α is a multiplicator factor (α is typically 0.5 or 1, where 0.5 give a decimation minimizing information loss, and 1 decimation minimizing aliasing).

For example, for two adjacent points, A and B, of a same row in the geometry image, the coordinates of these points are: A=(u,v) and B=(u+1,v). The corresponding screen projected points are:

$$A' = (x'_A, y'_A) \text{ and } B' = (x'_B, y'_B).$$

If the distance d(A',B') is equal to 0.2, we can estimate that the entire line of 16 points will be projected in a space of size: 3.2⇔0.2*16. So, the 16 points will be drawn on only four pixels. Based on this, we can choose a lowest decimation level. The previous formula proposes to use decimation level 2 if α is 0.5, and in this case the line will be decimated twice and the line will create four projected points that can be stored well in the 3.2 pixels of the screen, without too much overlapping. If α is set to 1, the previous formula proposes to use decimation level 3 and the line will be reduced to two points which ensure no aliasing at the cost of some loss of information.

If $$d(p'_{screen}, p''_{screen})$$

is lower than the pixel size, then the two adjacent points of the block will be projected onto the same pixel of the screen, and the block could be rendered at a lower resolution.

This process must be tuned according to the rendering method used to display the points on the screen (point, point with OpenGL point size, circle, splat, quad, . . . ) to adjust the a factor to the size of the area covered by the projection of one point.

For a better precision, more than two adjacent points of the block could be used. If several points are projected, the decimation level could be computed in two dimensions and two levels of decimation could be sent to the reconstruction process ($n_u$,$n_v$) and the block could be reconstructed using two resolutions following u and v. For example, if ($n_u$,$n_v$) are equal to (1,2), the reconstruction process will not create 16×16 points but only 8×4 points.

The information (whether to reconstruct each block and at which resolution) is sent to the actual model reconstruction algorithm, which generates the output vertices accordingly and each block is reconstructed according to its level of decimation.

Figure 14:
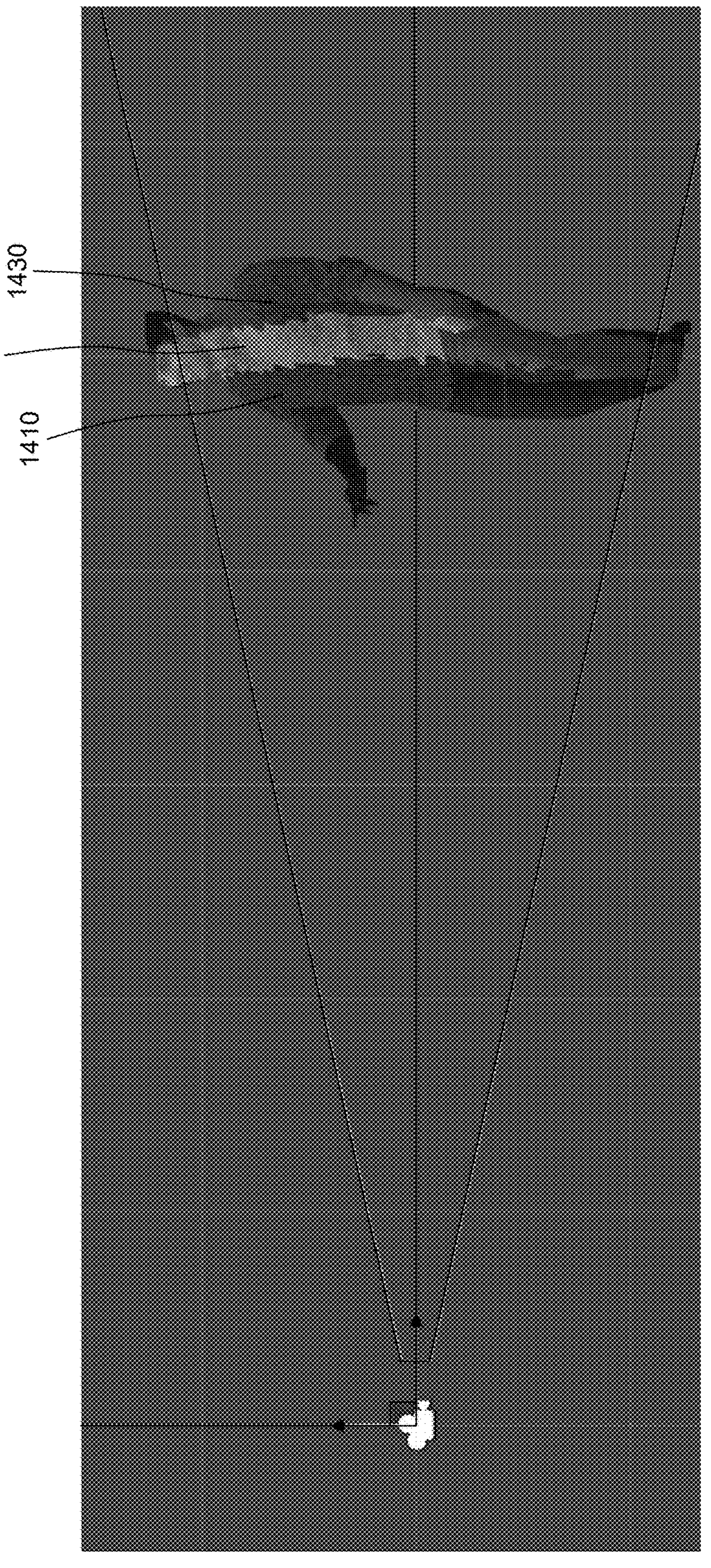
FIG. 14 illustrates an example of a decoded point cloud with several decimation levels, according to an embodiment.

FIG. 14 illustrates an example of a decoded point cloud with several decimation levels. The parts outside the camera window have been removed and the visible point cloud blocks have been reconstructed at different decimation levels. In particular, part 1410 is reconstructed at full resolution, part 1420 is reconstructed at resolution 2 (8×8=64 points were created for a block of 16×16 where 256 points should have been created without decimation), and part 1430 is reconstructed at resolution 4 (4×4=16 points were created for blocks of 16×16).

Various numeric values are used in the present application. The specific values are for example purposes and the aspects described are not limited to these specific values.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of decoding and reconstructing point cloud data, comprising:

obtaining rendering information from a renderer;

obtaining projection positions of two adjacent points of a block of a patch of a geometry image in a screen space, based on said rendering information;

selecting a resolution at which said block of said patch of said geometry image is to be reconstructed, based on said projection positions;

reconstructing said block of said patch at said selected resolution; and outputting said reconstructed block to said renderer.

2. The method of claim 1, further comprising:

comparing said projection positions of said two adjacent points of said block, wherein said resolution is selected responsive to said comparing.

3. The method of claim 1, further comprising:

comparing a distance between said projected positions to a second range of distance values, wherein said resolution is selected responsive to said comparing.

4. The method of claim 3, wherein said second range of distance values is adapted to a rendering method used by said renderer.

5. An apparatus for decoding and reconstructing point cloud data, comprising one or more processors and at least one memory coupled to said one or more processors, wherein said one or more processors are configured to:

obtain rendering information from a renderer;

obtain projection positions of two adjacent points of a block of a patch of a geometry image in a screen space, based on said rendering information;

select a resolution at which said block of said patch of said geometry image is to be reconstructed, based on said projection positions;

reconstruct said block at said selected resolution; and output said reconstructed block to said renderer.

6. The apparatus of claim 5, wherein said one or more processors are further configured to:

obtain projection positions of two adjacent points of said part block in a screen space, wherein said resolution is selected based on said projection positions.

7. The apparatus of claim 6, wherein said one or more processors are further configured to:

compare said projection positions of said two adjacent points of said block, wherein said resolution is selected responsive to said comparison.

8. The apparatus of claim 6, wherein said one or more processors are further configured to:

compare a distance between said projected positions to a second range of distance values, wherein said resolution is selected responsive to said comparison.

9. The apparatus of claim 8, wherein said second range of distance values is adapted to a rendering method used by said renderer.

* * * * *